US008607293B2

(12) United States Patent  (10) Patent No.: US 8,607,293 B2
Berger et al.  (45) Date of Patent: Dec. 10, 2013

(54) SYSTEM AND METHOD FOR DETERMINING NETWORK RELATIONSHIPS WITH UNRELIABLE DATA

(75) Inventors: Will Berger, Fairfax, VA (US); Matthew Stanek, Leander, TX (US)

(73) Assignee: Time Warner Cable, Inc., New York, NY (US)

( * ) Notice: Subject to any disclaimer, the term of this patent is extended or adjusted under 35 U.S.C. 154(b) by 860 days.

(21) Appl. No.: 12/771,179

(22) Filed: Apr. 30, 2010

(65) Prior Publication Data

US 2011/0271311 A1  Nov. 3, 2011

(51) Int. Cl.
*H04N 7/173* (2011.01)
*H04N 7/16* (2011.01)
*G06F 15/173* (2006.01)
*H04L 12/28* (2006.01)

(52) U.S. Cl.
USPC ............ 725/116; 725/146; 709/245; 370/389

(58) Field of Classification Search
USPC .................. 725/146, 148, 116, 118; 709/245; 370/389
See application file for complete search history.

(56) References Cited

U.S. PATENT DOCUMENTS

| | | | | |
|---|---|---|---|---|
| 7,139,247 B2 * | 11/2006 | Desai et al. | .................... | 370/255 |
| 8,214,465 B2 * | 7/2012 | Black et al. | .................... | 709/220 |
| 8,280,989 B2 * | 10/2012 | Archer et al. | ................. | 709/220 |
| 8,400,941 B2 * | 3/2013 | Gray et al. | ..................... | 370/254 |
| 2007/0106768 A1 * | 5/2007 | Frietsch et al. | ................ | 709/223 |
| 2010/0023603 A1 * | 1/2010 | Archer et al. | ................. | 709/220 |
| 2013/0067046 A1 * | 3/2013 | Clark et al. | .................... | 709/220 |

\* cited by examiner

*Primary Examiner* — James R Sheleheda
(74) *Attorney, Agent, or Firm* — The Marbury Law Group PLLC (57) ABSTRACT

A system and method for determining network relationships with unreliable data. An identifier of an addressable network element may be associated with a non-addressable network element. A first set of data is generated that associates a first identifier of each of a plurality of first addressable network elements in the network to one of a plurality of non-addressable network elements in the network to which the first addressable network elements are connected. A second data is generated that associates the first identifier of each of the plurality of the first addressable network elements to one of a plurality of second identifiers of a second addressable network element. When at least a threshold measure of the first set of first identifiers matches the second set of first identifiers, the second identifier is associated with the non-addressable network element.

18 Claims, 4 Drawing Sheets

SYSTEM AND METHOD FOR DETERMINING NETWORK RELATIONSHIPS WITH UNRELIABLE DATA

BACKGROUND

Service provider networks (for example cable, satellite and fiber networks) deliver voice, data, and video to subscribers over a complex web of hubs, nodes, amplifiers, line extenders, splitters and passive devices. Ideally, the connections into and out of all devices in the network will be documented. However, networks are constantly being reconfigured to add or remove devices, to redistribute network loads, and to improve efficiency. Thus, network topographical management is a continuing process.

Network mapping systems have been developed to assist in the topographical management of certain types of networks. Such networks are typically assembled from devices that exhibit a presence on the network. For example, devices with network addresses or other suitable identifiers may be queried to provide location information for each device. However, in networks in which the path between identifiable devices may include numerous devices that have no network presence ("non-addressable" devices), the network mapping systems are of little use.

Service provider networks not only use non-addressable devices but may use logical constructs that are not devices at all. For example, a video-on-demand (VOD) system allocate resources based on "VOD service groups." A VOD service group may represent a collection of network resources that are assigned to a number of other resources or to a group of subscribers. Such logical constructs make management of resources easier but are difficult to identify by any automated mechanism.

SUMMARY

Embodiments are directed to using available network topographical information to infer relationships between and among "non-addressable" network devices and/or logical constructs.

DETAILED DESCRIPTION

As used herein, the term "service provider network" encompasses both wired and wireless networks that provide access to services for a fee. Examples of service provider networks include DOCSIS, ADSL, fiber networks, hybrid-fiber-cable networks, and satellite networks.

In an embodiment, an inferential network mapping system accesses billing and engineering data sources to generate a map of a service provider network. The embodiments described below reference elements of a hybrid-fiber-cable (HFC) network. However, this is not meant as a limitation. One of ordinary skill will recognize that the systems and processes used to generate a map of an HFC network may be applied to networks that use different media for transporting signals and data.

Figure 1:
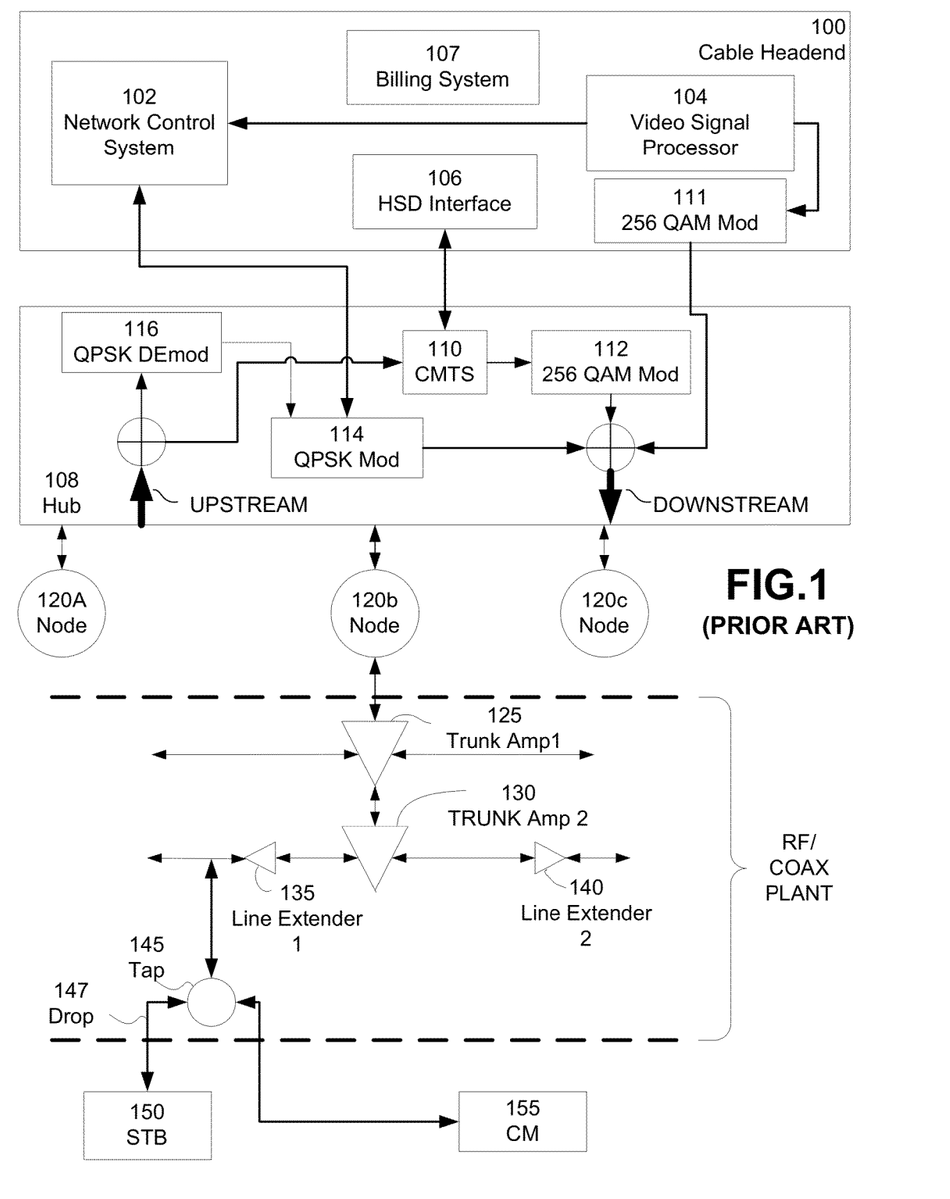
FIG. 1 is a block diagram illustrating elements of an HFC network as is known in the prior art.

FIG. 1 is a block diagram illustrating elements of an HFC network as is known in the prior art.

FIG. 1 illustrates typical prior art cable system architecture. A headend 100 comprises a network control system 102 that handles set-top provisioning, system management and interactive session set-up, a video signal processor 104 that handles content acquisition and delivery, 256 QAM Modulators 111 that generate modulated RF streams of digital video signals, a high speed data interface 106, and a billing system 107.

Headend 100 communicates with hub 108. Hub 108 comprises a cable modem termination system 110, a 256 QAM modulator 112 for downstream data traffic, a QPSK modulator for downstream Out-of-Band Data traffic 114, and a QPSK demodulator 116 for upstream Out-of-Band Data traffic. As will be appreciated by those skilled in the art, a hub may comprise multiple instances of each device illustrated in FIG. 1.

Hub 108 communicates with nodes 120A, 120B and 120C. Nodes 120 provide an interface between the fiber-based transport medium of the cable network (between the headend 100 and upstream side of nodes 110) and the coax-based medium (between the downstream side of nodes 110 and the taps 145). The downstream side of node 110B is further illustrated as connecting to trunk amplifier 1 125 which in turn is connected to trunk amplifier 2 130. The serial path from node 120B through trunk amplifier 1 125 to trunk amplifier 2 130 is referred to as a cascade relative to node 120B. Trunk amplifier 1 125 has three branches that are cascades relative to trunk amplifier 1 125 and sub-cascades relative to node 120B.

As illustrated in FIG. 1, the communication paths include network devices with network presence (for example, the CMTS 110, the STB 150 and the modem 156) and network devices that are "non-addressable" (node 120, trunk amplifier 125 and line extender 135).

Figure 2:
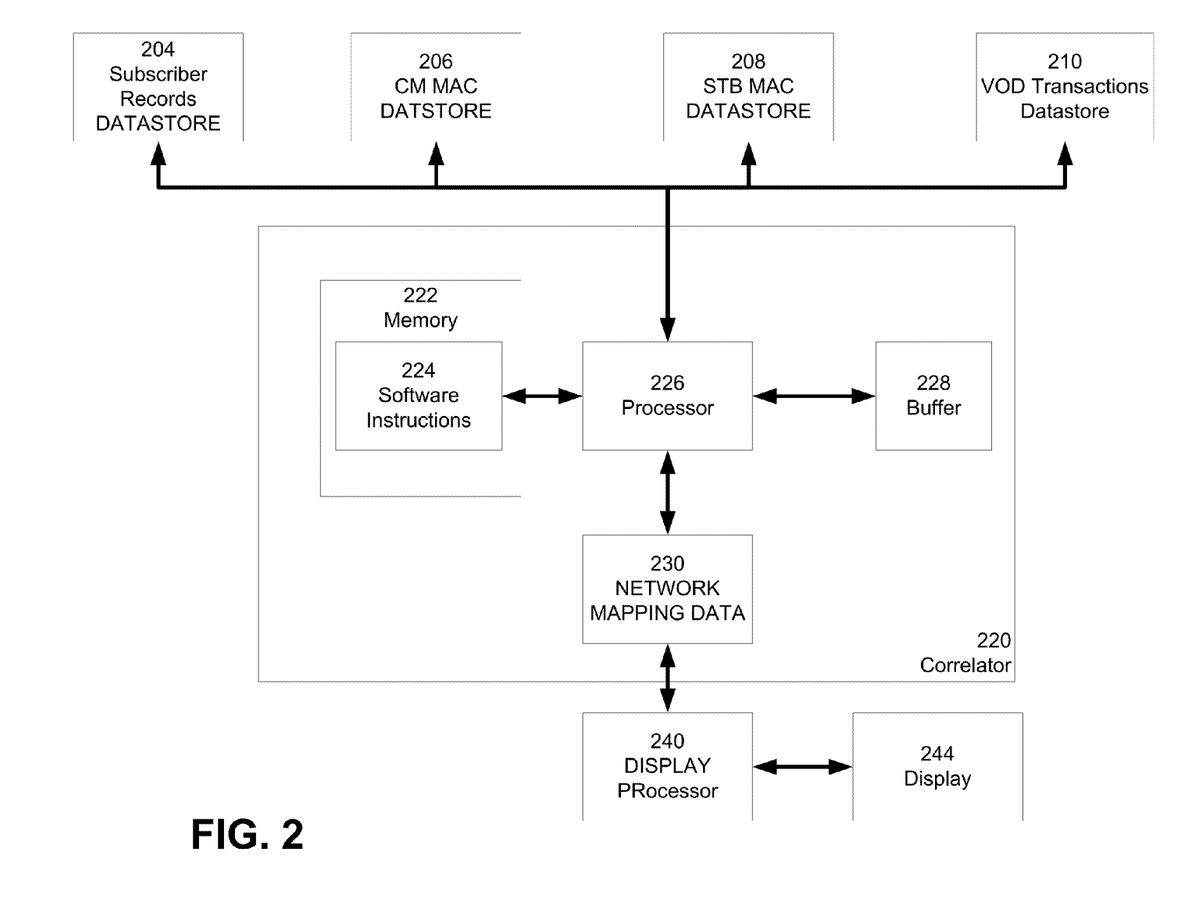
FIG. 2 is a block diagram illustrating a network mapping system according to an embodiment.

FIG. 2 is a block diagram illustrating a network mapping system according to an embodiment.

The network mapping system 200 comprises a correlator 220 that receives network data from various sources including a subscriber records datastore 204, a CM MAC datastore 206, a STB MAC datastore 208 and a VOD transaction datastore 210. The correlator 220 may include a memory 222 in which software instructions 224 reside. The software instructions are executed by a processor 226 and cause the correlator 220 to perform correlation operations on data accessible to the processor from datastores 204, 206, 208 and 210. The data and any intermediate results of the correlation operations on the data may be temporarily stored in a buffer 228. The final results of the correlation operations performed on the data are stored in a network mapping data datastore 230. In an embodiment, the mapping data are accessed by a display processor 240 that generates a graphical image for display on a display device 244.

In an embodiment, the correlation operations that are performed on the data by the processor 226 determine relationships between and among network devices that are not directly determinable from such devices. In another embodiment, the correlation operations that are performed on the data by the processor 226 determine relationships between and among network constructs and network devices.

By way of illustration, an identifier of an addressable network element may be associated with a non-addressable network element. The processor 226 may acquire first data from a first datastore. The first data associates a first identifier of each of a plurality of first addressable network elements in the network to one of a plurality of non-addressable network elements in the network to which the first addressable network elements are connected. For example, the first data may associate a MAC address of a modem to a node to which the modem is connected. The processor 226 may acquire second data from a second datastore. The second data associates the first identifier of each of the plurality of the first addressable network elements to one of a plurality of second identifiers of a second addressable network element. For example, the second data may associate the MAC address of a modem with a CMTS port identifier. The processor 226 may use the first data to identify a first set of first identifiers associated with a particular non-addressable network element and the second data to identify a second set of first identifiers associated with a particular one of the second identifiers of the second network device. The processor 226 may then compare the first and second sets to determine to what extent the sets containing matching elements. When at least a threshold measure of the first set of first identifiers matches the second set of first identifiers, the processor may determine that the second identifier is associated with the non-addressable network element. For example, the CMTS node identifier may be associated with a particular node.

Figure 3:
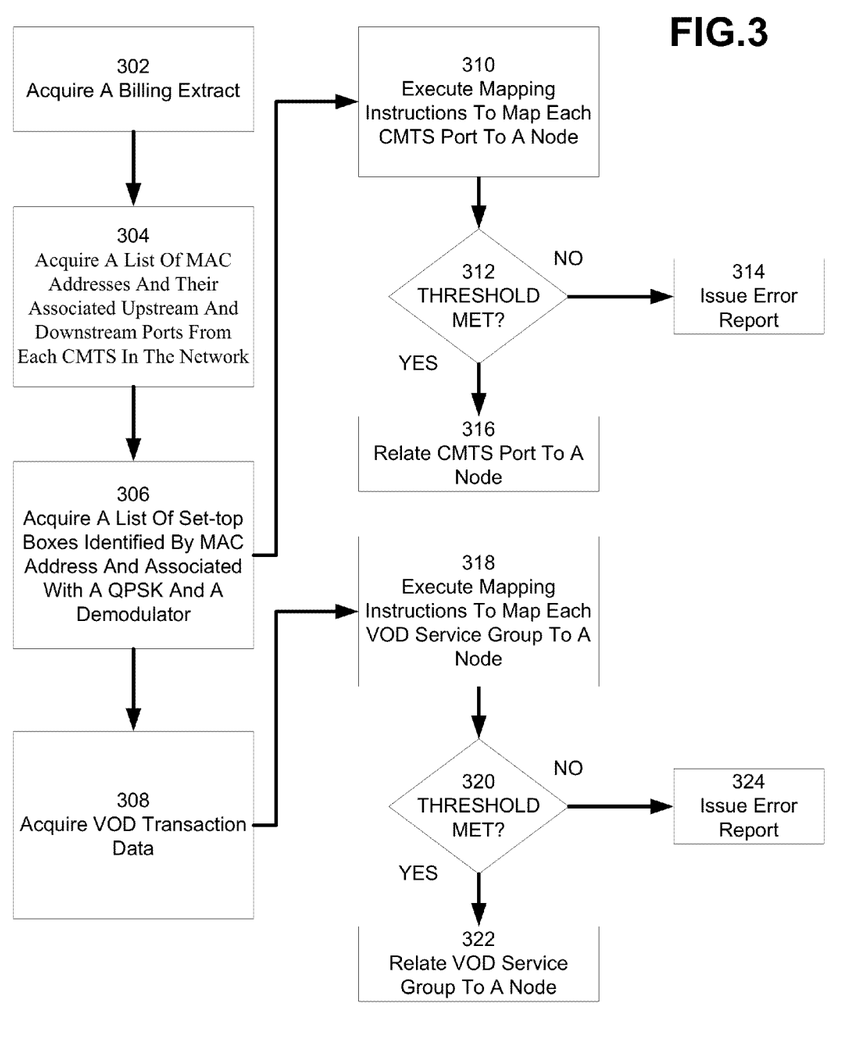
FIG. 3 is flow diagram illustrating a process by which a CMTS port may be identified and associated with a node and with a VOD service group according to an embodiment.
Figure 4:
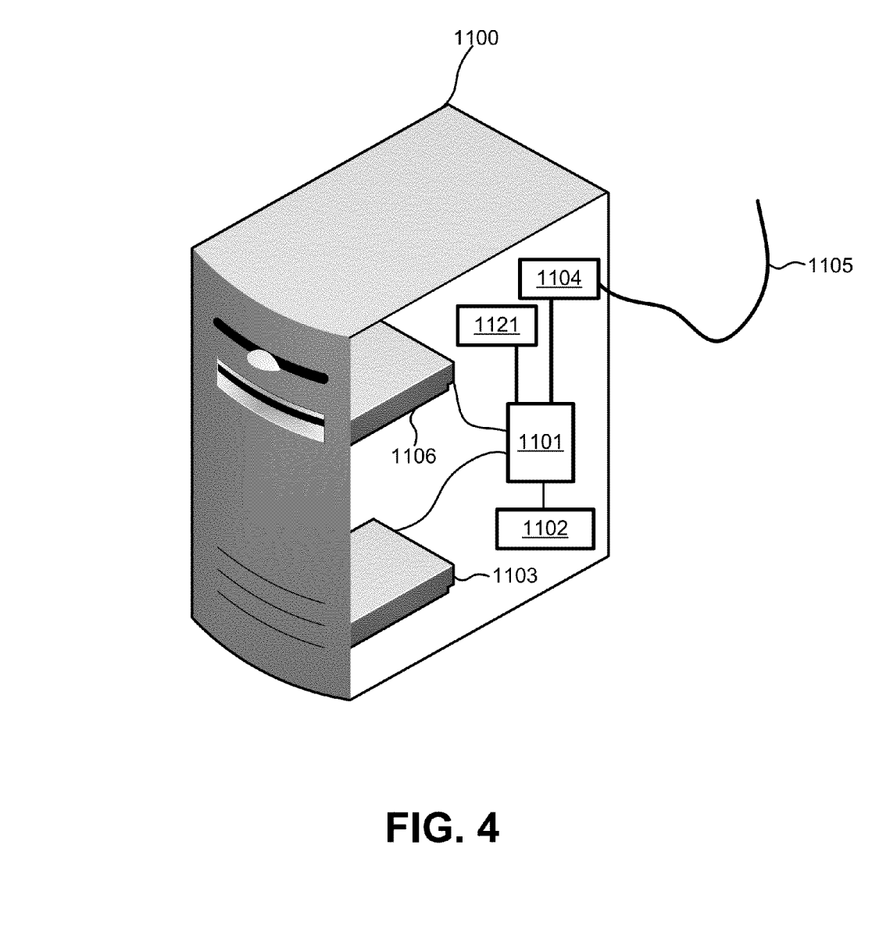
FIG. 4 is a component block diagram illustrating a computing device suitable for use in the various embodiments.

FIG. 3 is flow diagram illustrating a process by which a CMTS port may be identified and associated with a node and with a VOD service group according to an embodiment.

A billing extract is acquired (block 302) from the subscriber records datastore 204. In an embodiment, the billing extract includes all of the CPE devices active in the HFC network and their associated outside plant devices. At a minimum this includes a MAC address, an Account Number, and a Node. An example of this data is presented in Table 1 below:

TABLE 1

| MAC | Account | Node |
|---|---|---|
| 0014F85227AE | 57103703 | C81A (Cable Modem) |
| 0011E652ABE4 | 57103703 | C81A (Cable Box) |

As presented in Table 1, a subscriber account 57103703 is associated with a cable modem and a set-top box each of which is connected to a node identified as node C81A. The MAC address of the cable modem and the set-top box are also known. The node associated with the account in this is example is a "non-addressable" device in that it has no network presence. It should also be recognized that the node data in Table 1 may not be correct. That is, the data in a particular record may not be trustworthy.

The CM MAC datastore 206 maintains a list of cable modems that connect to a particular upstream and downstream port of a cable modem termination system (CMTS). A list of MAC addresses with their associated upstream and downstream ports is acquired from each CMTS in the network (block 304). An example of this data is presented in Table 2 below:

TABLE 2

| MAC | CMTS | Upstream Port |
|---|---|---|
| 0014F85227AE | austtxc-10k2 | C5/0/2/U0 |

The STB MAC datastore 208 maintains a list of set-top boxes (STBs) identified by MAC address and associated with a QPSK and a demodulator. A list of MAC addresses with their associated QPSK and demodulator is acquired (block 306). An example of this data is presented in Table 3 below:

TABLE 3

| MAC | QPSK | Demodulator |
|---|---|---|
| 0011E652ABE4 | C3QPSK | Demod 6 |

A VOD transaction datastore 210 maintains session data of each VOD transaction that has been negotiated between a VOD system (not illustrated) and a STB. The transaction data are acquired (block 308) and provide the MAC address of the STB, the VOD service group to which the STB MAC address is associated, and the QAM that provided the VOD services. An example of this data is presented in Table 4 below:

TABLE 4

| STB MAC | VOD Service Group | QAM |
|---|---|---|
| 0011E652ABE4 | Hub C G37 | VQCG10 |

From these data, the mapping software instructions 224 may be executed to map each CMTS port to a node (block 310) and/or a VOD service group to node (block 318). Because the data may be untrustworthy, the mapping logic is expressed in terms of a threshold.

When mapping CMTS ports to a node, if the threshold is met (that is, if the answer to block 312 is "Yes"), a CMTS port may be related to a particular node (block 316). If the threshold is not met (that is, if the answer to block 310 is "No"), an error message is generated (block 314).

By way of illustration and not by way of limitation, mapping statements may be expressed as follows:

If 80% of the cable modems in C81A are attached to austtxc-10k2 C5/0/2/U0 then C81A is fed by CMTS port austtxc-10k2 C5/0/2/U0.

If 80% of the STBs in C81A are attached to C3QPSK Demod 6, then C81A is fed by C3QPSK Demod 6.

The threshold of 80% is used for illustration purposes and is not meant to be limiting.

"Knowing" which CMTS port and which demodulator feed node C81A provides significant advantages when issues arise on the network. For example, if subscribers connected to C81A report problems with high speed data services but not with video services, the problem is likely to involve CMTS port austtxc-10k2 C5/0/2/U0. If subscribers connected to C81A report problems with both high speed data and video services, then the problem is likely to involve node C81A.

The mapping of devices to node C81A may also be used to determine whether those devices are oversubscribed. In this case, C81A is one of a list of nodes that are fed by CMTS port austtxc-10k2 C5/0/2/U0 and a list of nodes that are fed by C3QPSK Demod 6. The loading of the CMTS and demodulator may be evaluated based on the mapping of all such devices to the various nodes in the network.

When mapping VOD service groups to nodes, if the threshold is met (that is, if the answer to block 318 is "Yes"), a VOD service group may be related to a particular node (block 316). If the threshold is not met (that is, if the answer to block 318 is "No"), an error message is generated (block 324). By way of illustration and not by way of limitation, a mapping statement may be expressed as follows:

If 80% of the STBs in C81A order VOD sessions from service group Hub C G37, then C81A is serviced by that service group.

A hub is a physical location in which many network devices reside and provide service. Because many of the network devices within the hub have no network presence, a manual inventory must be kept to associate such network devices with a particular hub. Given that these devices number in the thousands for a moderate sized MSO, this inventory is complicated to maintain manually. Typically, the devices stored in hub are not under the control of a single management group and may be subject to a variety of inventory methodologies within the same hub location.

In an embodiment, network elements are associated with a hub automatically without human inventory tracking. A node is associated to a hub. This association can be accomplished through a variety of means, the most common being a string match. For example, a node may be named based on the hub from which it receives services. Thus, node 'A101' would receive service from 'Hub A'. In this context the hub name may be extracted by finding the alphabetical portion of the text that precedes the numerical data. Once this linkage is created, the mappings that exist between the node and a network element (for example, a node to a QPSK or a node to a CMTS port) as described above may be used to link those network elements to a Hub. For example:

If 90% of the modems in Node R101 are on CMTS austtxr-10k1 then Node R101 is fed by CMTS austtxr-10k1.

If 90% of the nodes being fed by CMTS austtxr-10k1 belong to Hub 'R' then austtxr-10k1 is located in Hub R.

This logic can be applied again upstream of the Hub to identify a 'division' that owns a given Hub. The logic to accomplish this result may be as follows:

If 90% of the modems on austtxr-10k1 are in the Austin division, then the CMTS belongs to Austin.

If 90% of the modems in Hub R are in Austin then Hub R belongs to Austin.

By linking the customer record at the MAC address level to network elements that have a presence on the network, it is possible to map any number of arbitrary geographical associations such as hub and division to each other and to various network elements. Once the devices or groupings are linked to a subscriber record, then any knowledge that can be retrieved from the subscriber record can trickle up to these devices. As the information scheme is moved up the network, additional relationships may be added. Thus, each subsequent generation of devices may be the foundation dataset for the mappings of the next.

A call agent area is a group of digital phone customers who share a common voice switch that provides them service. A voice switch is typically located at a regional data center and has access to the MAC addresses of digital phones that are connected to it. This information may be used, for example, to facilitate maintenance and fault identification, and to comply with mandated 911 service constraints. The MAC address may be used by the network mapping system 200 illustrated in FIG. 2 and as described above to establish the following relationships:

1) MAC address of the digital phone to Customer Record (Provided by the Billing Data Source)
2) MAC Address to Node (Provided by the Billing Data Source)
3) MAC Address to Division (Provided by the Billing Data Source)
4) Node to Hub (Provided by the Hub Name)
5) MAC Address to CMTS (Provided by the CMTS)
6) MAC Address to Call Agent (Provided by the Call Agent or by the Digital Phone itself)
7) Node to CMTS (mapping determined by linking #2 to #5)
8) Node to Call Agent (mapping determined by linking #2 to #6)
9) CMTS to Call Agent (mapping determined by linking #7 to #8)
10) CMTS to Hub (mapping determined by linking #4 to #7)
11) Hub to Call Agent (mapping determined by linking #9 and #10)
12) Call Agent to Division (mapping determined by linking #3 and #6)

Through the above process it becomes possible to clearly predict the impacted area of maintenance to a given voice switch. The inferred relationships described in number paragraphs 7-12 above are determined and validated by applying logical thresholds as described previously that effectively discard improbable linkages.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

A number of the embodiments described above may also be implemented with any of a variety of computing devices, such as the computing device 1100 illustrated in FIG. 3. Such a computing device 1100 typically includes a processor 1101 coupled to volatile memory 1102 and a large capacity non-volatile memory, such as a disk drive 1103. The computing device 1100 may also include a floppy disc drive and/or a compact disc (CD) drive 1106 coupled to the processor 1101. The computing device 1100 may also include network access ports 1104 coupled to the processor 1101 for establishing data connections with network circuits 1105 over a variety of wired and wireless networks using a variety of protocols. The computing device 1100 may further comprise a video receiver unit 1121 to provide video demodulation and tuning capabilities. The video receiver unit 1121 may be implemented in hardware, software or a combination of hardware and software.

While the computing device 1100 is illustrated as using a desktop form factor, the illustrated form is not meant to be limiting. For example, some or all of the components of computing device 1100 may be implemented as a desktop computer, a laptop computer, a mini-computer, or a personal data assistant.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method of establishing a relationship between an addressable network element and a non-addressable network element comprising:
    a processor acquiring first data from a first datastore, wherein the first data associates a first identifier of each of a plurality of first addressable network elements in the network to one of a plurality of non-addressable network elements in the network to which the first addressable network elements are connected;
    the processor acquiring second data from a second datastore, wherein the second data associates the first identifier of each of the plurality of the first addressable network elements to one of a plurality of second identifiers of a second addressable network element;
    the processor using the first data to identify a first set of first identifiers associated with a particular non-addressable network element;
    the processor using the second data to identify a second set of first identifiers associated with a particular second identifier of a particular second network device;
    the processor comparing the first and second sets of first identifiers; and
    the processor storing the particular second identifier in association with the particular non-addressable network element when at least a threshold measure of the first set of first identifiers matches the second set of first identifiers, wherein the threshold measure is less than one.

2. The method of claim 1, wherein the non-addressable network element is a network node, wherein the first identifier is a MAC address of a cable modem, wherein the second identifier is a port identifier on a cable modem termination system (CMTS) and wherein the method associates a particular cable modem CMTS port identifier with a particular network node.

3. The method of claim 2, wherein the first datastore is a subscriber account datastore and the second datastore is a cable modem termination system datastore.

4. The method of claim 1, wherein the non-addressable network element is a network node, wherein the first identifier is a MAC address of a set-top box (STB), wherein the second identifier is a video on demand (VOD) demodulator identifier and wherein the method associates a particular VOD demodulator identifier with a particular network node.

5. The method of claim 4, wherein the first datastore is a subscriber account datastore and the second datastore is a STB datastore.

6. The method of claim 1, wherein the non-addressable network element is a network node, wherein the first identifier is a MAC address of a set-top box (STB), wherein the second identifier is a video on demand (VOD) service group identifier and wherein the method associates a particular VOD service group identifier with a particular network node.

7. The method of claim 6, wherein the first datastore is a subscriber account datastore and the second datastore is a VOD transaction datastore.

8. The method of claim 1 further comprising:
    a second processor generating a graphical representation of the relationship of the association of the second identifier with the non-addressable network element.

9. The method of claim 8 further comprising:
the second processor sending the graphical representation to a display device; and
displaying the graphical representation on the display device.

10. A correlator apparatus for establishing a relationship between of an addressable network element and a non-addressable network element comprising:
a memory, wherein the memory comprises software executable instructions; and
a processor, wherein the processor accesses the software executable instructions in the memory, and wherein the processor is configured with the software executable instructions that cause the correlator to perform operations comprising:
acquiring first data from a first datastore, wherein the first data associates a first identifier of each of a plurality of first addressable network elements in the network to one of a plurality of non-addressable network elements in the network to which the first addressable network elements are connected;
acquiring second data from a second datastore, wherein the second data associates the first identifier of each of the plurality of the first addressable network elements to one of a plurality of second identifiers of a second addressable network element;
using the first data to identify a first set of first identifiers associated with a particular non-addressable network element;
using the second data to identify a second set of first identifiers associated with a particular second identifier of a particular second network device;
comparing the first and second sets of first identifiers; and
storing the particular second identifier in association with the particular non-addressable network element when at least a threshold measure of the first set of first identifiers matches the second set of first identifiers, wherein the threshold measure is less than one.

11. The correlator apparatus of claim 10, wherein the non-addressable network element is a network node, wherein the first identifier is a MAC address of a cable modem, wherein the second identifier is a port identifier on a cable modem termination system (CMTS) and wherein the correlator apparatus associates a particular CMTS port identifier with a particular network node.

12. The correlator apparatus of claim 11, wherein the first datastore is a subscriber account datastore and the second datastore is a cable modem termination system datastore.

13. The correlator apparatus of claim 10, wherein the non-addressable network element is a network node, wherein the first identifier is a MAC address of a set-top box (STB), wherein the second identifier is a video on demand (VOD) demodulator identifier and wherein the correlator apparatus associates a particular VOD demodulator identifier with a particular network node.

14. The correlator apparatus of claim 13, wherein the first datastore is a subscriber account datastore and the second datastore is a STB datastore.

15. The correlator apparatus of claim 10, wherein the non-addressable network element is a network node, wherein the first identifier is a MAC address of a set-top box (STB), wherein the second identifier is a video on demand (VOD) service group identifier and wherein the correlator apparatus associates a particular VOD service group with a particular network node.

16. The correlator apparatus of claim 15, wherein the first datastore is a subscriber account datastore and the second datastore is a VOD transaction datastore.

17. The correlator apparatus of claim 10 wherein the processor is further configured with the software executable instructions that cause the correlator to perform operations comprising generating a graphical representation of the relationship of the association of the second identifier with the non-addressable network element.

18. The correlator apparatus of claim 17 wherein the processor is further configured with the software executable instructions that cause the correlator to perform operations comprising:
sending the graphical representation to a display device; and
displaying the graphical representation on the display device.

* * * * *

UNITED STATES PATENT AND TRADEMARK OFFICE
CERTIFICATE OF CORRECTION

PATENT NO. : 8,607,293 B2  
APPLICATION NO. : 12/771179  
DATED : December 10, 2013  
INVENTOR(S) : Will Berger and Matthew Stanek Page 1 of 1

It is certified that error appears in the above-identified patent and that said Letters Patent is hereby corrected as shown below:

On the Title Page

Item (73) Assignee

Please delete "Time Warner Cable, Inc." and insert --Time Warner Cable Enterprises LLC--

Signed and Sealed this
Twenty-eighth Day of April, 2015

Michelle K. Lee
*Director of the United States Patent and Trademark Office*